US006510351B1

(12) United States Patent
Blevins et al.

(10) Patent No.: US 6,510,351 B1
(45) Date of Patent: Jan. 21, 2003

(54) MODIFIER FUNCTION BLOCKS IN A PROCESS CONTROL SYSTEM

(75) Inventors: Terrence L. Blevins, Round Rock, TX (US); Dennis L. Stevenson, Round Rock, TX (US); Mark J. Nixon, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/270,291

(22) Filed: Mar. 15, 1999

(51) Int. Cl.$^7$ ............................. G05B 11/01; G06F 9/06
(52) U.S. Cl. ............................ 700/18; 700/87; 712/234
(58) Field of Search ................................ 700/5, 18, 19, 700/24, 25, 87; 709/201; 712/233, 234, 242, 243

(56) References Cited

U.S. PATENT DOCUMENTS

| 4,271,505 A | | 6/1981 | Menot et al. ............... 370/400 |
| 4,491,916 A | * | 1/1985 | Vallhonrat .................. 710/107 |

(List continued on next page.)

FOREIGN PATENT DOCUMENTS

| DE | 195 10 466 A1 | 10/1996 |
| EP | 0 450 116 A1 | 4/1990 |
| EP | 0 449 458 A1 | 10/1991 |
| EP | 0 546 339 A1 | 6/1993 |
| EP | 0 562 333 A2 | 9/1993 |
| EP | 0 575 150 A2 | 12/1993 |
| EP | 0 604 091 A2 | 6/1994 |
| WO | WO 92/04676 | 3/1992 |
| WO | WO 94/22776 | 10/1994 |
| WO | WO 96/12993 | 5/1996 |

OTHER PUBLICATIONS

Jeri R. Hanly, Elliot B. Koffman, Joan C. Horvath, C Program Design for Engineers, 1995, Addison–Wesley Publishing Company, Inc., chapter 4, pp. 126–161.*
"Advanced Systems Simplify Control," Machine Design, vol. 68, No. 12, pp. 118, 120 (Jul. 11, 1996).
Black, "Combining Lan Technology with Smart Sensors to Provide Predictive Maintenance, Diagnostics and Alarm Systems," Proceedings of the Industrial Computing Conference, Chicago, vol. 3, Sep. 19, 1993, Industrial Computing Society/Instrument Society of America, pp. 345–354 (1993).

(List continued on next page.)

Primary Examiner—Leo Picard
Assistant Examiner—Paul Rodriguez
(74) Attorney, Agent, or Firm—Marshall, Gerstein & Borun (57) ABSTRACT

A modifier function block adapted for use in process control routine includes a series of processor implementable instructions that conditionally enhance or modify the functionality of a base function block associated with the process control routine. The base function block includes a resettable branching point located within a set instructions used to perform a process control related operation. The branching point of the base function block has a pointer which, when set to a first value, causes another of the set of instructions within the base function block to be executed (to thereby bypass the execution of the modifier function block), and which, when set to a second value, causes the series of instructions within the modifier function block to be executed (to thereby alter the functionality of the base function block). In this manner, the modifier function block may be conditionally called, depending on the state of the base function block, to change the operation of the base function block or to, alternatively, leave the functionality of the base function block unaltered.

28 Claims, 3 Drawing Sheets

U.S. PATENT DOCUMENTS

| | | | | |
|---|---|---|---|---|
| 4,539,633 A | * | 9/1985 | Shigemasa et al. | 700/42 |
| 4,627,045 A | | 12/1986 | Olson et al. | 370/225 |
| 4,691,328 A | | 9/1987 | Sterling, Jr. et al. | 375/257 |
| 4,831,558 A | | 5/1989 | Shoup et al. | 702/188 |
| 4,918,690 A | | 4/1990 | Markkula, Jr. et al. | 370/400 |
| 4,955,305 A | | 9/1990 | Garnier et al. | 112/475.05 |
| 4,965,742 A | * | 10/1990 | Skeirik | 700/86 |
| 4,974,625 A | | 12/1990 | Paullus et al. | 137/85 |
| 4,976,144 A | | 12/1990 | Fitzgerald | 73/168 |
| 5,014,185 A | | 5/1991 | Saito et al. | 700/83 |
| 5,023,869 A | | 6/1991 | Grover et al. | 370/421 |
| 5,109,692 A | | 5/1992 | Fitzgerald | 73/168 |
| 5,127,090 A | * | 6/1992 | Ruehle et al. | 709/246 |
| 5,148,433 A | | 9/1992 | Johnson et al. | 714/10 |
| 5,193,189 A | | 3/1993 | Flood et al. | 709/103 |
| 5,197,328 A | | 3/1993 | Fitzgerald | 73/168 |
| 5,404,289 A | * | 4/1995 | Hang et al. | 700/55 |
| 5,404,524 A | | 4/1995 | Celi, Jr. | 713/2 |
| 5,434,774 A | | 7/1995 | Seberger | 700/67 |
| 5,439,021 A | | 8/1995 | Burlage et al. | 137/84 |
| 5,451,923 A | | 9/1995 | Seberger et al. | 340/310.06 |
| 5,469,150 A | | 11/1995 | Sitte | 340/3.42 |
| 5,469,548 A | | 11/1995 | Callison et al. | 711/114 |
| 5,485,455 A | | 1/1996 | Dobbins et al. | 370/225 |
| 5,530,643 A | | 6/1996 | Hodorowski | 700/86 |
| 5,550,980 A | | 8/1996 | Pascucci et al. | 359/111 |
| 5,558,115 A | | 9/1996 | Lenz et al. | 137/86 |
| 5,573,032 A | | 11/1996 | Lenz et al. | 137/486 |
| 5,592,622 A | | 1/1997 | Isfeld et al. | 709/207 |
| 5,598,566 A | * | 1/1997 | Pascucci et al. | 713/324 |
| 5,631,825 A | | 5/1997 | van Weele et al. | 700/83 |
| 5,650,777 A | | 7/1997 | Westfield et al. | 340/870.11 |
| 5,684,451 A | | 11/1997 | Seberger et al. | 340/310.06 |
| 5,768,119 A | | 6/1998 | Havekost et al. | 700/4 |
| 5,801,942 A | | 9/1998 | Nixon et al. | 700/83 |
| 5,828,851 A | | 10/1998 | Nixon et al. | 710/105 |
| 5,838,563 A | | 11/1998 | Dove et al. | 700/83 |
| 5,903,455 A | * | 5/1999 | Sharpe, Jr. et al. | 700/83 |
| 5,956,758 A | * | 9/1999 | Henzinger et al. | 711/213 |
| 6,094,600 A | * | 7/2000 | Sharpe, Jr. et al. | 700/19 |
| 6,424,872 B1 | * | 7/2002 | Glanzer et al. | 700/18 |
| 6,434,737 B1 | * | 8/2002 | Nishi et al. | 717/105 |

OTHER PUBLICATIONS

Watt, "The Double–Distributed Control Network," Thesis submitted to Thayer School of Engineering, Dartmouth College, Hanover, N.H. (Jan. 1984).

Zielinski et al., "Asset Management Using Fieldbus," Fisher–Rosemont Systems, Inc, pp. 1–14 (1997).

Zielinski, "Issues for Digital Field Instrument Networks," INTECH, pp. 92–94 (1989).

DeltaV™ System Overview Brochure, Fisher–Rosemount Systems, 32 pages (1998).

DeltaV™ Product Data Sheets, DeltaV Control Network, Workstation Specifications, DeltaV Controller, DeltaV Power Supplies, DeltaV I/O Subsystem, DeltaV Diagnostics, DeltaV Event Chronicle, DeltaV Excel Add–in, DeltaV Real–Time Data Server, 56 pages (1996).

Configuring CL6010, CL6210, and CL7010 Series Interactive and Computing Controllers, FG4.2:CL6011, 27 pages (1985).

Fieldbus Foundation Manual, Communications Technical Specification and User Layer Technical Specification, 1994–1997, including Fieldbus Message Specification FF–870–1.1; Physical Layer Conformance Testing FF–830 FS 1.0; Device Description Language FF–900–1.0; Function Blocks (Part 1) FF–890–1.2; Fieldbus Access Sublayer FF–875–1.1; Function Blocks (Part 2) FF–891–1.2; Data Link Protocol FF–822–1.1; System Management FF–880–1.1; Communication Profile FF–940–1.0; Transducer Blocks (Part 1) FF–902 Rev PS 2.0; Transducer Blocks (Part 2) FF–903–Rev PS 2.0; Data Link Services FF–821–1.0; 31.25 kbit/s Physical Layer Profile FF–816–1.0; Network Management FF–801–1.1; and System Architecture FF–800–1.0.

"FIELDVUE® ValveLink™ Series VL2000 Software," Fisher–Rosemount Bulletin 62.1: VL2000, pp. 1–6 (Nov. 1995).

"FIELDVUE® VL2000 Series Software User Guide," Fisher Controls, Version 2.0 (Jun. 1996).

"FIELDVUE® Digital Valve Controller Type DVC5000 Series," Fisher–Rosemount Bulletin 62.1:DVC5000, pp. 1–12 (Jun. 1994).

"FIELDVUE™, Digital Valve Controller DVC:5000 Series Remotely Accessible Information," Fisher Controls Bulletin 62.1DVC5000(S1), pp. 1–2 (Jun. 1994).

"FIELDVUE™ Digital Valve Controller Type DVC5000 Series," Fisher Controls Form 5335, pp. 1–35 and Errata Sheet (Jun. 1994).

Fisher–Rosemount Systems, "Fieldbus Technical Overview Understanding FOUNDATION™ Fieldbus Technology," 27 pages, 1997.

"FOUNDATION™ Specification, Function Block Application Process," Part 3, 155 pages, 1995–1996.

Fieldbus Foundation™, "Technical Overview," FD–043 Revision 1.0, 29 pages, 1996.

* cited by examiner

MODIFIER FUNCTION BLOCKS IN A PROCESS CONTROL SYSTEM

FIELD OF THE INVENTION

The present invention relates generally to process control networks and, more specifically, to a device and method for enhancing the capability of function block elements within a process control environment.

DESCRIPTION OF THE RELATED ART

Process control networks, such as those used in chemical, petroleum or other processes, have generally included a centralized process controller communicatively coupled to one or more field devices which may be, for example, valve positioners, switches, sensors (such as temperature, pressure and flow rate sensors), etc. These field devices may perform physical control functions within the process (such as opening or closing a valve), may take measurements within the process for use in controlling the operation of the process or may perform any other desired function within the process. Process controllers have historically been connected to field devices via one or more analog signal lines or buses which may carry, for example, 4–20 mA (milliamp) signals to and from the field devices. Generally speaking, the process controller receives signals indicative of measurements made by one or more field devices and/or other information pertaining to the field devices, uses this information to implement a typically complex control routine and then generates control signals which are sent via the analog signal buses to the field devices to thereby control the operation of the process.

Recently, there has been a move within the process control industry to implement field-based digital control and communications within the process control environment. For example, the process control industry has developed a number of standard, open, digital or combined digital and analog communication protocols such as the HART®, PROFIBUS®, WORLDFIP®, Device-Net® and CAN protocols. These digital communication protocols enable more field devices to be connected to a particular bus, support more and faster communications between the field devices and the controller and/or allow field devices to send more and different types of information, such as information pertaining to the status and configuration of the field device itself, to the process controller. Furthermore, these standard digital protocols enable field devices made by different manufacturers to be used together within the same process control network.

Also, there is now a move within the process control industry to decentralize process control and, thereby, simplify process controllers. Decentralized control is obtained by having field mounted process control devices, such as valve positioners, transmitters, etc., perform one or more process control functions using what are typically referred to as function blocks and by then communicating data across a bus structure for use by other process control devices (or function blocks) in performing other control functions. To implement these control functions, each process control device includes a microprocessor having the capability to implement one or more function blocks as well as the ability to communicate with other process control devices using a standard and open communication protocol. In this manner, field devices can be interconnected within a process control network to communicate with one another and to perform one or more process control functions forming a control loop without the intervention of a centralized process controller. The all-digital, two-wire bus protocol now being promulgated by the Fieldbus Foundation, known as the FOUNDATION™ Fieldbus (hereinafter "Fieldbus") protocol is one open communication protocol that allows devices made by different manufacturers to interoperate and communicate with one another via a standard bus to effect decentralized control within a process.

As indicated above, some of these communication protocols, as well as some controller protocols used to implement or perform process control (such as proprietary controller protocols), use a basic building block typically referred to as a function block to implement specific parts of control routines or communication routines. For example, the Fieldbus protocol defines numerous function blocks that perform input functions (such as measuring the output of a sensor), control functions (such as implementing a proportional-integral (PI) or a proportional-integral-derivative (PID) control algorithm, a tuning algorithm, etc.), output functions (such as driving a valve positioner to open or close a valve) or other functions within a process control network. While these function blocks can be initially created and changed as desired to perform different functions within a process control environment, function blocks are generally static in nature once they are compiled and connected within a controller or communication environment. Upgrading an installed function block or enhancing the capability of an installed function block to perform additional or modified functions requires the operator to create a new function block with the upgraded capabilities and to recompile the new function block within the controller or communication environment, which can be time consuming and can require the process or part of the process to be taken off line. Furthermore, it is difficult to provide conditional capabilities for function blocks. That is, function blocks must typically be compiled within a process control or communication environment to include all of the capabilities that will ever be used within the function block, even if some of those capabilities are not needed for a particular purpose or are used only infrequently. One example of this is providing tuner capabilities within a function block that performs PI or PID control. Currently, if a manufacturer wants to provide tuner capabilities for a PI or PID control function block, the manufacturer must initially include such tuner capabilities in the PI or PID control function block before providing such a control block to a user. Thereafter, these tuner capabilities must be compiled and installed with the PI or PID control block whenever that control block is used, even if the user does not need or want the auto-tuning capabilities of the control block. In such an instance, the added functionality of the tuner merely takes up overhead and processing time in the installed routine.

SUMMARY OF THE INVENTION

A modifier function block that is adapted for use in process control routine includes a series of processor implementable instructions that conditionally enhance or modify the functionality of a base function block associated with the process control routine. The base function block includes a resettable branching point located within a set of instructions used to perform a process control related operation. The branching point of the base function block has a pointer which, when set to a first value, causes another of the set of instructions within the base function block to be executed (to thereby bypass the execution of the modifier function block), and which, when set to a second value, causes the series of instructions within the modifier function block to be executed (to thereby alter the functionality of the base function block). In this manner, the modifier function block may be conditionally called, depending on the state of the base function block, to change the operation of the base function block or to, alternatively, leave the functionality of the base function block unaltered.

The modifier function block may include an interface that defines the data associated with the base function block which is to be used by the modifier function block and may also include a return instruction that returns processor control to the set of instructions within the base function block when each of the series of instructions within the modifier function block has been executed.

DESCRIPTION OF THE PREFERRED EMBODIMENTS

Figure 1:
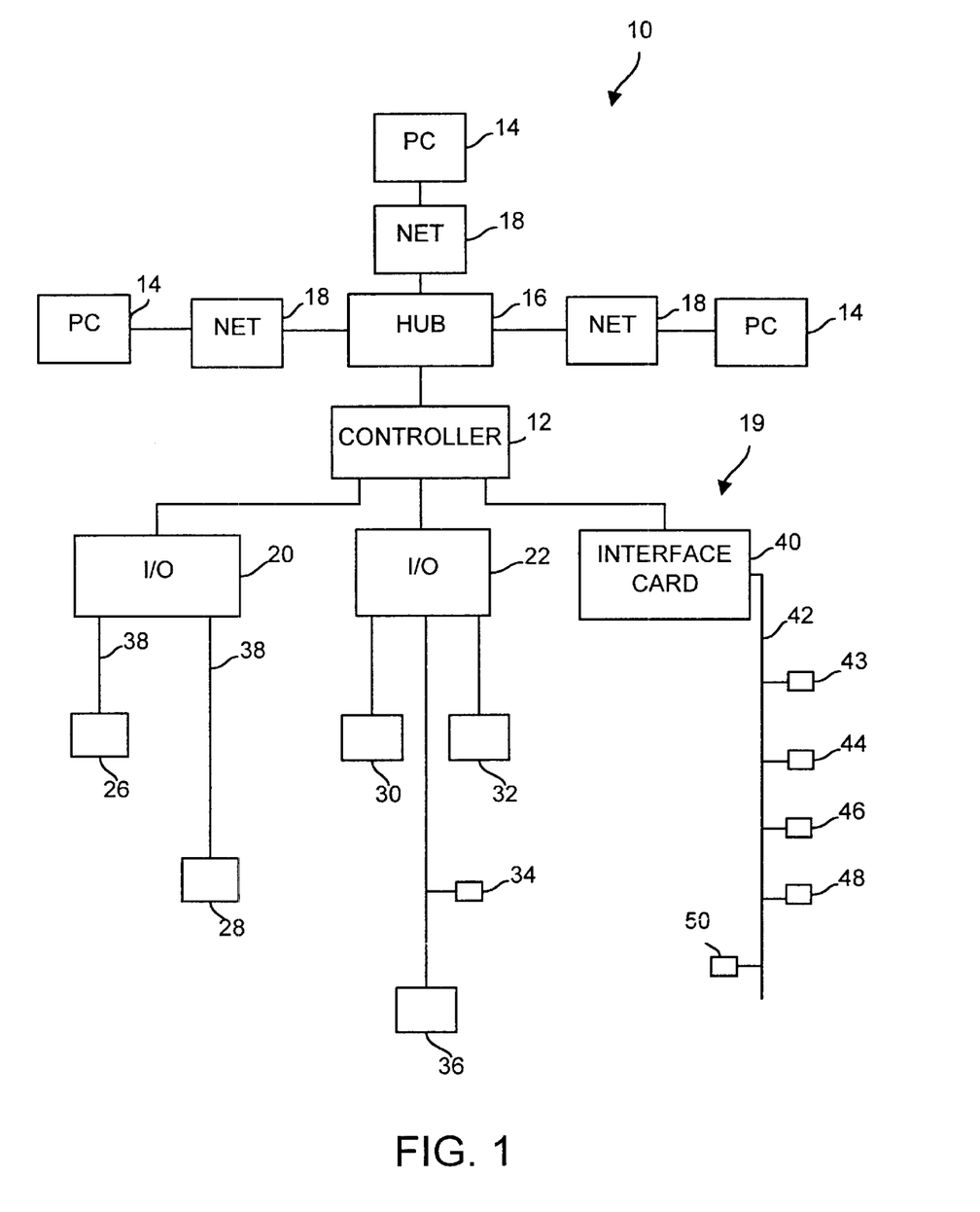
FIG. 1 is a schematic block diagram of a process control network.

Referring now to FIG. 1, a process control network 10 includes a centralized process controller 12 capable of implementing a process control routine stored therein and/or capable of communicating with control elements, such as function blocks, located within field devices distributed throughout the process control network 10. The controller 12 may be, by way of example only, the DeltaV™ controller sold by Fisher-Rosemount Systems, Inc. and may be connected to numerous workstations such as personal computers (PCs) 14 via a hub 16 and ethernet connections 18. In this configuration, the PCs 14 may be used by one or more operators or users to communicate with the process controller 12 (or other controllers connected within the network 10), to obtain information pertaining to the process control network 10, to review or change the status of the process control network 10, to obtain information pertaining to individual field devices within the process control network 10, etc. If the controller 12 is a DeltaV controller, it may provide a graphical depiction of the process control routine within the controller 12 to the user via one of the PCs 14 illustrating the function blocks or other control elements within the process control routine and the manner in which these function blocks are communicatively linked together to provide control of the process. Furthermore, if desired, a user or operator may be able to initiate tuning of one or more of the function blocks or control loops from one of the PCs 14.

As illustrated in FIG. 1, the controller 12 is connected to numerous field devices located throughout a process (indicated generally by reference number 19). The controller 12 may communicate through any standard types of I/O cards 20 and 22 to typical field devices 26, 28, 30, 32, 34 and 36 which are subject to centralized control from the controller 12. The I/O card 20 may be, for example, an analog I/O card that connects the controller 12 to analog field devices 26 and 28 which communicate over 4 to 20 mA buses 38. Likewise, the I/O card 22 may be a digital or combined digital and analog I/O card that communicates with digital or mixed digital and analog field devices. Of course, the field devices 26, 28, 30, 32, 34 and 36 may be any types of field devices including transmitters, sensors, valve positioners, valve controllers, etc. As will be understood for the example process control network 10 illustrated in FIG. 1, the field devices 26–36 are associated with portions of the process 19 subject to centralized control by a control routine stored within the controller 12. Thus, the communicatively interconnected function blocks used to implement control of these devices are stored in and executed by the controller 12.

The controller 12 is also communicatively connected to an interface card 40 which, in turn, is connected to (or is part of) a process control network in which process control is performed in a distributed manner. In the embodiment illustrated in FIG. 1, the decentralized process control portion of the process 19 includes the interface card 40, a bus 42 and numerous field devices 43, 44, 46, 48 and 50 connected to the bus 42. The device 43 may be, by way of example, a transmitter that measures some process variable while the device 44 may be a positioner/valve device that controls the flow of a fluid within the process 19. The distributed process control network of FIG. 1 may be, for example, a Fieldbus network which uses the Fieldbus communication protocol and the interface card 40 may be a link active scheduler associated with the Fieldbus communication protocol.

The centralized process control routine located within the controller 12 receives inputs from the field devices 26–36 and potentially 43–50, performs calculations and other activities associated with the control routine (typically using interconnected function blocks) and then sends commands to the field devices via the I/O cards 20 and 22 and the interface card 40 to implement any desired control of the process 19. It should be noted, however, that the decentralized process control portion of the process control network 10 (i.e., that associated with the bus 42 in FIG. 1) may implement its own process control routine in a decentralized manner in conjunction with (or instead of) the control being performed by the controller 12. Thus, while the controller 12 may interface with and perform some control over the devices 43–50 connected to the bus 42, these devices may also store and execute control functions or function blocks to implement distributed control.

Although the decentralized portion of the process control network 10 of FIG. 1 uses the Fieldbus communication and control protocol, it could use any other known or desired protocol as well, including protocols developed in the future. Generally speaking, the Fieldbus protocol is an all-digital, serial, two-way communication protocol that provides a standardized physical interface to a two-wire loop or bus interconnecting "field" equipment such as sensors, actuators, device controllers, valves, etc. located in an instrumentation or process control environment of, for example, a factory or a plant. The Fieldbus protocol provides, in effect, a local area network for field instruments (field devices) within a process, which enables these field devices to perform control functions at locations distributed throughout a process facility and to communicate with one another before and after the performance of these control functions to implement an overall control strategy. Because the Fieldbus protocol enables control functions to be distributed throughout a process control network, it reduces the workload of the process controller 12 or eliminates the need of the processor 12 for those field devices or areas of the process. It will be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. As a result, the details of the Fieldbus communication protocol will not be described in detail herein.

In any case, a modifier function as described herein may be used to modify, enhance or otherwise change the capability or operation of any function block or other functional element located in the controller 12, in any of the I/O cards 20, 22 and 40, in any of the field devices 26–36 and 43–50 of FIG. 1 or in any other device within the process control network 10. Thus, although the modifier function block is described herein as being implemented in the Fieldbus protocol it may, instead, be implemented in any other control or communication protocol including any of those associated with any controller or communication protocol now being used or developed in the future.

Figure 2:
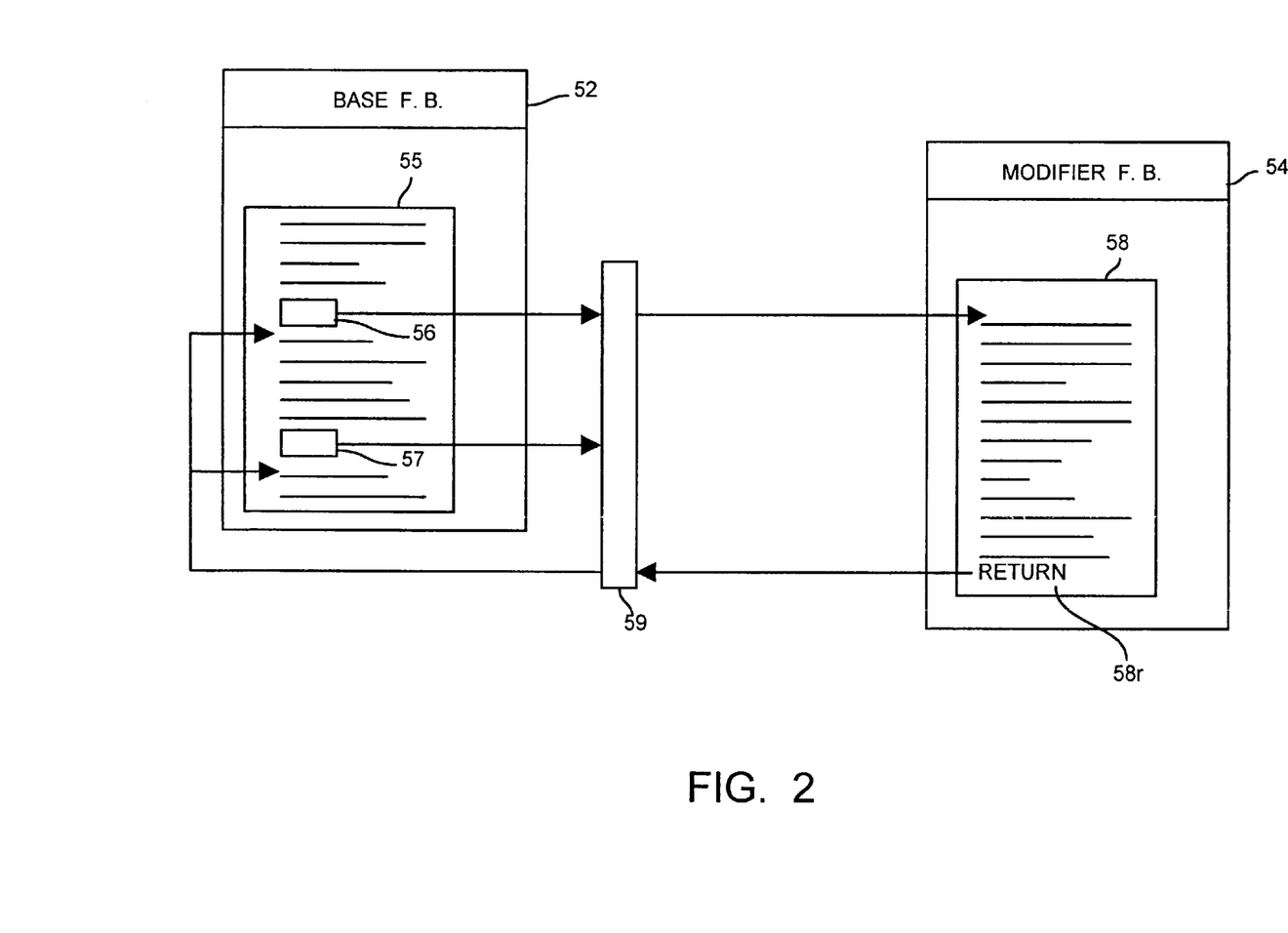
FIG. 2 is a schematic block diagram of a modifier function block used in conjunction with a base function block within a process control environment.

FIG. 2 generally depicts a base or original function block 52 and a modifier function block 54 that can be used to change, upgrade, or enhance the capability of the base function block 52. As is known, the base function block 52 includes a software routine or algorithm 55 therein having one or more sets of instructions (which may be any type of code) to be executed by a processor within the device in which the base function block 52 is located so as to perform an operation within a process control routine. However, the algorithm 55 of the base function block 52 is modified to include one or more branching points (illustrated in FIG. 2 as the points 56 and 57) which are used to conditionally implement some enhanced capability within the algorithm 55, such enhanced capability being provided by the modifier function block 54 having a software routine or algorithm 58 therein made up of a series of instructions.

Generally speaking, the branching points 56 and 57 are set up in the base function block 52 when it is created. The contents of these branching points may be initially set and later changed (preferably after compiling the base function block 52) to include a pointer either to the modifier function block 54 or to the next line of code in the base algorithm 55. For example, the pointer at the break point 56 is initially set to point to the next line of code within the algorithm 55 and, thus, to cause the algorithm 55 to operate without the enhanced capability. However, when some enhanced capability or functionality is desired to be added to the base function block 52, the pointer at one or more branching points (e.g., the point 56) is set to cause the algorithm 55 to call or otherwise transfer control to the algorithm 58 within the modifier function block 54 when the algorithm 55 reaches that branching point. The pointer at the branching point 56 may be an address indicating the address of the modifier function block 54 in memory, the address of some part of the algorithm 58 of the modifier function block 54, the name or other identifier of the modifier function block 54 or may be any other handle or branching device used to pass control to the modifier function block 54.

When control is passed to the modifier function block 54, certain predefined data is sent to or made available to the modifier function block 54 and the modifier function block 54 uses or changes this data during operation of the algorithm 58. While the pointer at the branching point may include this data, this data is preferably provided through a fixed or predefined interface, illustrated in FIG. 2 as the interface 59. The interface 59 typically includes any of the parameter or data values required for use by the modifier function block 54 (or pointers thereto, such as addresses), where to return control within the base function block 55 and/or any other data or information needed by the modifier function block 54 to take control, execute, and return control to the base function block 52. The interface 59 may be implemented as a predefined section of memory within a device, may be provided within the base or modifier function block or may be provided in any other manner.

When receiving control, the modifier function block 54 implements its algorithm 58 acting on the data provided via the interface 59 and, when complete, a return instruction therein (denoted in FIG. 2 as the instruction 58r) returns control to the point in the algorithm 55 of the base function block 52 that immediately proceeds or follows (in the execution sense) the break or branching point from which control was released. This return point may be the next line or instruction of code within the base function block 52 or may be defined in some manner by the interface 59 to be some other location with the base function block 52. The modifier function block 54 returns certain data via the interface 59 (which may be the same or a different interface than that used to send control to the modifier function block 54), which data is used by the algorithm 55 in the base function block 52. If desired or necessary, the modifier function block 54 may return control to a point other than the point that immediately follows the branching point during normal operation of the base function block (i.e., without the enhanced capabilities of the modifier function block) if, for example, the modifier function block 54 makes execution of parts of the algorithm 55 of the base function block 52 unnecessary or redundant. In this case, it may be expedient for the base function block 52 to provide a return point to the modifier function block 54 via the interface 59 which the return instruction 58r then uses to provide control back to the algorithm 55 of the base function block. It will be apparent that the return instruction 58r may be any desired type of return instruction, such as a GOTO or an END LOOP instruction, and/or may take on any other form depending on the type of code used in the modifier function block 54.

While two branching points 56 and 57 are illustrated in FIG. 2, one, three or any other number of branching points can be placed in the base function block 52 to provide for enhanced capability at one or more points in the algorithm 55. Furthermore, the branching points within the base function block 52 may be set to call different parts or subroutines of the algorithm 58 within the modifier function block 54 to thereby provide different enhanced functions at different parts of the base algorithm 55. This functionality may be necessary to implement an entirely new procedure, such as tuning, within the base function block 52, which may need to have different capabilities added at different points within the base algorithm 55. Of course, different branching points within the base algorithm 55 may be set up to call the same or different parts of a single modifier function block or may be set up to call different modifier function blocks as desired.

When initially sold or installed in a system, the base function block 52 can be provided with branching points 56 and/or 57 (as well as any other desired branching points) set to allow enhanced capability of modifier function blocks to be provided to the user at a later date. When the user does not need or want to implement the functionality associated with modifier function block(s), the user needs only to store a null value or a null instruction (which causes the processor to simply do nothing and go to the next instruction) or some other indication at the branching point within the base algorithm 55, indicating that the algorithm 55 should continue without calling a modifier function block. This can be done prior to or after compiling the base function block 52 within a process control or communication routine.

Thereafter, when a modifier function block capability is to be added, the value of the pointer at one or more of the branching points within the base algorithm 55 is changed to cause the base algorithm 55 to call the appropriate modifier function block when the branching point is reached. Typically, this can be done without recompiling the base function block 52. (Of course the modifier function block 54 must be compiled and stored in memory before execution thereof.) Thereafter, the modifier function block 54 is called when the base algorithm 55 reaches the branching point. When called, the modifier function block 54 implements its algorithm 58 to enhance or change the functionality of the algorithm 55 within the base function block 52. When the enhanced or new functionality is no longer desired, such as at the end of a tuning procedure, the branching points can be reset to prevent the base function block 52 from calling the modifier function block 54.

In this manner, the base function block 52 can be initially sold without the upgraded capability, which reduces the documentation and overhead associated with that function block. However, the base function block 52 can be upgraded merely by adding an appropriate modifier function block 54 to the device in which the base function block 52 is stored and changing one or more pointers within the algorithm 55 of the base function block 52. This enables base function blocks to be enhanced or changed at a later date without having to install a whole new base function block 52 and without having to recompile the base function block 52, which makes upgrading the base function block 52 easier. Furthermore, different modifier function blocks can be developed for the same base function block which gives the user even more choices in terms of upgrading the system. This also enables function block providers to supply different versions or upgrades of a modifier function block with relative ease. Furthermore, the algorithm 55 of the base function block 52 does not have to be modified to provide additional capability where a function block is designed to support a standard interface to modifier blocks. Likewise, support for added functionality is invoked only as is indicated by block attributes set during configuration or through a custom application such as a tuning application. This results in reduced memory and CPU requirements when the features provided by a modifier function block are not required during normal operation of the process.

As will be understood, when using modifier function blocks, the base function block typically remains the same except for the fact that it must be have the capability to call the modifier function block, i.e., have one or more resettable branching points therein. This feature makes it easier to change the code of the base function block 52 by merely changing the code of the modifier function block 54, which can be added to and deleted from the system more easily than the base function block 52 (which is typically required for operation of the process control routine). This greatly speeds up the development of advanced control capabilities and means that a user will only have to add overhead to the base function block 52 when that user has a particular application which uses those features. That is, the user or operator can reduce the overhead of the system by not compiling and using the modifier function block 54 when the added functionality provided by the modifier function block 54 is not needed.

It will be apparent that the modifier function block 54 described herein can be used for any purpose or in any manner to change, modify or upgrade a base function block 52, to provide enhanced capabilities for any type of base function block (such as an input, output or control function block), either at all times or at selected times. Thus, for example, a modifier function block may be used to add auto-tuning capabilities to a control function block, to implement adaptive gain, gain scheduling, dead time compensation, etc. in a base function block, or to provide any other enhanced or modified capability to a base function block.

Likewise, it will be understood that the base function block 52 and the modifier function block 54 may be stored in any memory or memories of a device or within any memory or memories associated with a processor executing these function blocks, such as in RAM, ROM, EPROM or EEPROM, on a hard drive, on a disc drive, or in any other suitable memory accessible by the processor. Likewise, these function blocks may be sold or otherwise provided to a user stored in any desired type of memory, such as a magnetic disc, an optical disc (e.g., a compact or laser disc), a magnetic or optical tape or any other computer readable storage medium. Also, the base and modifier function blocks may be provided to a user as a single unit (e.g. stored in the same memory) or as separate units (e.g., stored in separate memories) at the same or at different times.

Figure 3:
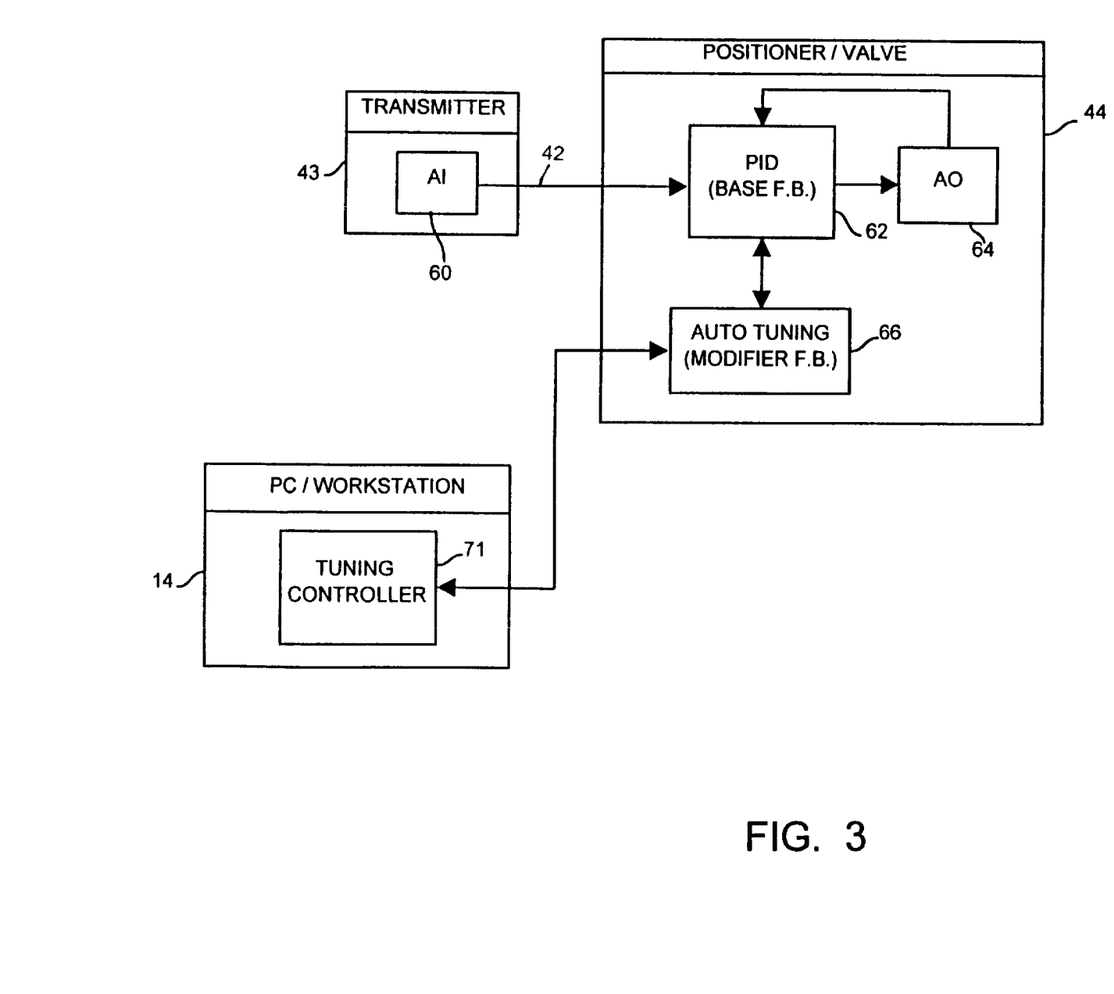
FIG. 3 is a schematic block diagram of a process control loop having a modifier function block used to implement auto-tuning functions for a base PID function block.

Referring to FIG. 3, an embodiment of a modifier function block that provides a conditional auto-tuning capability to a PID controller function block will be described. The interconnected function blocks of FIG. 3 make up a control loop that may be implemented within, for example, a Fieldbus network or any other distributed control environment in which the function blocks within a control loop are located in different devices interconnected by a communication network such as a bus. The control loop illustrated in FIG. 3 includes an analog input (AI) function block 60 (which may be, for example, located in the transmitting field device 43 of FIG. 1), a PID function block 62 and an analog output (AO) function block 64. For the example loop of FIG. 3, the PID function block 62 and the AO function block 64 are located in the positioning/flow regulating field device 44 of FIG. 1. The communication connections between the function blocks 60, 62 and 64 are illustrated in FIG. 3 by lines attaching the process and control inputs and outputs of these functions blocks. Thus, an output of the AI function block 60, which may comprise a process variable measurement or a process parameter signal, is communicatively coupled via the Fieldbus wire 42 to the input of the PID function block 62 which, in turn, has an output comprising a control signal communicatively coupled to an input of the AO function block 64. An output of the AO function block 64, which comprises a feedback signal indicating, for example, the position of the valve 44, is connected to a control input of the PID function block 62. The PID function block 62 uses this feedback signal along with the process measurement signal from the AI function block 60 (and potentially other signals or set points) to implement any desired control of the AO function block 64 to thereby control the process variable measured by the AI function block 60. The connections indicated by the lines in the control loop diagram of FIG. 3 may be performed internally within a field device when, as in the case of the AO and the PID function blocks 64 and 62, the function blocks are within the same field device.

A modifier function block 66 is provided within the same device as the PID function block 62 (i.e., the positioner/valve 44) and is provided for use in auto-tuning the PID function block 62 which, in this case, is a base function block. The modifier auto-tuning function block 66 is communicatively coupled to and controls the PID function block 62 during operation of at least part of a tuning procedure by sending signals to the PID function block 62, changing an output of the function block 62, etc. In one embodiment, the modifier auto-tuning function block 66 drives the PID function block 62 to cause the control loop comprising the function blocks 60, 62 and 64 to go into a controlled induced oscillation procedure. The modifier auto-tuning function block 66 also collects data generated by or delivered to the PID function block 62 during operation of the loop and, preferably, stores this data in a memory of the device 44. At some point, i.e., when enough data has been collected, the modifier auto-tuning function block 66 determines any desired process characteristics, which may be any process, loop or device characteristics, from the collected data using any known or desired procedure. Thereafter, the modifier auto-tuning function block 66 provides or communicates the calculated process characteristics to a tuning controller 71 which supports a user interface and uses these process characteristics along with user inputs to determine one or more tuning parameters for the PID function block 62 or other function blocks within the loop being tuned. The tuning controller 71 is illustrated as being located in one of the workstations or PCs 14 apart from the device 44, but may, instead, be in any other device such as the controller 12, the same device as the modifier auto-tuning function block 66, or any other device. In fact, if desired, the tuning controller 71 may be part of the modifier auto-tuning function block 66.

Initially, the base PID function block 62 includes one or more branching points therein set so as not to pass control to the modifier auto-tuning function block 66. When so set, the base PID function block 62 operates normally within the process control routine to implement standard control of the loop in which the PID function block 62 located. However, when auto-tuning is desired, a tuning application, which may be stored in and run from the controller 12 or one of the PCs 14 of FIG. 1, causes the pointer(s) at the appropriate branching point(s) within the base PID function block 62 to be changed to thereby call the modifier auto-tuning function block 66. Of course, the auto-tuning function block must be compiled and stored in the memory of the device 44 prior to being called.

Thereafter, when the base PID function block 62 is run, it executes its algorithm until the branching point is reached, at which time the modifier auto-tuning function block 66 is called and is executed. At this time, the modifier auto-tuning function block 66 may determine appropriate PID inputs that will cause the base PID function block 62 to control the loop to undergo controlled induced oscillation and passes these inputs back to the PID function block 62 via the interface 59 (of FIG. 2). At this or some other point during operation of the PID function block 62, the modifier auto-tuning function block 66 is called to recognize and store data (passed to it by the PID function block 62 via the interface 59) needed for determining a process characteristic. After these functions are complete, the modifier auto-tuning function block 66 returns control to the base PID function block 62 using a return instruction.

When the modifier auto-tuning function block 66 has enough data, it calculates one or more process characteristics for the process loop and sends these process characteristics to the tuning controller 71. The modifier auto-tuning function block 66 (or the tuning controller 71) may then inform the tuner application that the tuning procedure is complete, at which time the tuning controller 71, the modifier auto-tuning function block 66 or the tuner application changes the pointers within the base PID function block 62 back to their original value so that the modifier auto-tuning function block 66 is no longer called when the base PID function block 62 is run.

In this embodiment, the modifier auto-tuning function block 66 may use any desired tuning procedure such as any open-loop or closed-loop tuning technique. Likewise, the modifier auto-tuning function block 66 may measure any desired variables including, for example, the output of the AO function block 64, the set point of the PID function block 62, the output of the AI function block 60, etc. to determine the desired process or loop characteristics. As noted above, the modifier auto-tuning function block 66 may be configured to use a controlled induced oscillation procedure to determine the desired process characteristics. In such a configuration, the modifier auto-tuning function block 66 may apply, to a control input of the PID function block 62, a square wave signal having a selectable peak-to-peak value of 2d centered about the value of the control signal delivered to the PID function block 62 before induced oscillation was initiated. In response to such a square wave signal, the control loop of FIG. 3 undergoes induced oscillation and the output of the AI function block 60 (i.e., the process variable) oscillates having a peak-to-peak amplitude 2a and a period $T_u$. From the amplitude a of the process variable and the amplitude of the square wave signal, the ultimate gain $K_u$ of the process can be derived according to the equation:

$$K_u = \frac{4d}{\pi a} \qquad (1)$$

and the ultimate period $T_u$, of the process can be calculated as being equal to the period of oscillation of the process variable. The modifier auto-tuning function block 66 may, of course, measure other data and determine other desired process characteristics including, for example, the time delay $T_d$ and the dominant time constant of the process.

After calculating such process characteristics, the modifier auto-tuning function block 66 provides these characteristics to the tuning controller 71 which determines, from the quantities $K_u$ and $T_u$, a set of tuning parameters including, for example, the proportional gain $K_p$, the integral time constant $T_i$ or the derivative time constant $T_d$ of the base PID control function block 62 using any known technique. The tuning controller 71 may, at some point, provide these tuning parameters (or any other calculated tuning parameters) to the base PID function block 62 to thereby retune the base PID function block 62 and/or the loop in which it operates.

Notwithstanding the above discussion, it will be understood that the auto-tuning function block 66 may implement any desired dynamic data capture routine including any of the numerous routines which are known for control loops having PI, PID, fuzzy logic or other types of control elements therein. For example, the auto-tuning function block 66 may implement a controlled induced oscillation procedure, such as a Hädgglund-Åström relay tuning procedure described in U.S. Pat. No. 4,549,123, the disclosure of which is hereby expressly incorporated by reference herein. In the relay type tuning method, the auto-tuning function block 66 brings the process loop (made up of the function blocks 60, 62 and 64) into self-oscillation using, for example, a non-linear feedback function and measures the response of the process loop to determine desired process characteristics, such as the ultimate gain and the ultimate period.

Likewise, the tuning controller 71 may use any desired method of determining tuning parameters from the process or loop characteristics (or raw data) calculated by or collected by the modifier auto-tuning function block 66. For example, the tuning controller 71 may use any of the tuning parameter calculations methods described or referred to in U.S. Pat. No. 5,748,467, the disclosure of which is hereby expressly incorporated by reference herein, including, for example, internal model control (IMC) tuning, Cohen and Coon tuning, Ziegler-Nichols tuning, or modified Ziegler-Nichols tuning, to name a few. In general, however, the tuning controller 71 stores one or more sets of rules (such as a fuzzy logic rule set or any set of linear or non-linear algorithms) which it uses to determine tuning parameters, such as the gain and time constant, according to the type of function block being tuned.

When used in a Fieldbus environment, the modifier auto-tuning function block 66 executes in the same execution time frame as the base function block (e.g., the PID function block 62). To satisfy this requirement, the modifier auto-tuning function block 66 must be located in the same device as the base PID function block 62 so that communications therebetween do not need to occur over the Fieldbus wire 42 (of FIG. 1). However, in other protocols or controller environments, it may not be necessary to place the modifier function block 66 in the same device as the base function block to have the modifier function block execute in a timely manner, i.e., without upsetting the timing schedule of the control or communication routine in which the modifier function block is operating. Furthermore, in the Fieldbus environment, if the modifier function block 66 is to be used at all (even if infrequently), the timing schedule of the base function block 62 must be initially established to account for any additional execution time used by the modifier function block 66. The modifier function block 66 need not be visible to a user as a function block within the process control system because it is merely modifying the algorithm of a base function block 62. If desired, however, the tuner application that supports the user interface for initiating auto-tuning and for selecting tuning can obtain information from the modifier function block 66 using the well-known OPC protocol.

It will be readily apparent that the use of an auto-tuning modifier function block 66 for the PID function block 62 in FIG. 3 is merely exemplary. Any other type of modifier function block could be used with any other type of base function block in any other control loop. Still further, a modifier function block may be used in a process control system that implements only distributed control (such as in a pure Fieldbus environment), only centralized control (i.e., wherein all of the function blocks or function elements are provided within a single controller) or in one which implements mixed centralized and distributed control.

Of course, modifier function blocks can be implemented using any external process control communication protocol (besides the Fieldbus protocol) and may be used to communicate with any type of function block including any function block that is similar to or the same as any of the different function blocks specifically identified by and supported by the Fieldbus protocol. Moreover, while the modifier function block in one embodiment hereof is a Fieldbus "function block," it is noted that the use of the expression "function block" herein is not limited to what the Fieldbus protocol identifies as a function block but, instead, includes any other type of block, program, hardware, firmware, etc., associated with any type of control system and/or communication protocol that can be used to implement some process control routine function and that has a predefined setup or protocol for providing information or data to other such function blocks. Thus, while function blocks typically take the form of objects within an object oriented programming environment, this need not be case and can, instead, be other logical units used to perform particular control (including input and output) functions within a process control environment.

Although the modifier function block described herein is preferably implemented in software stored in, for example, a controller or other process control device, it may alternatively or additionally be implemented in hardware, firmware, etc., as desired in different applications. If implemented in software, the modifier function block may be stored in any computer-readable memory such as on a magnetic disk, a laser disk, or other storage medium, in a RAM or ROM of a computer, controller, field device, etc. Likewise, this software may be delivered to a user or a device via any known or desired delivery method including, for example, over a communication channel such as a telephone line, the Internet, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A function block entity for use in a process control system that performs a process control routine using a multiplicity of communicatively interconnected function blocks, each having a software routine therein for controlling an associated processor, where one or more of the multiplicity of interconnected function blocks provide output signals to one or more other of the multiplicity of interconnected function blocks, and receive at least one input signal from one or more other of the multiplicity of interconnected function blocks, the function block entity comprising:

a base function block having a first series of processor implementable instructions that cause a first processor to perform a function associated with the process control routine and a resettable branching point located within the first series of instructions, said base function block stored in a first computer readable memory to be accessed by the first processor; and a modifier function block having a second series of processor implementable instructions, said modifier function block stored in a second computer readable memory to be accessed by the first processor;

wherein the resettable branching point includes a pointer settable to a first value that causes the first processor to execute another of the first series of processor implementable instructions within the base function block and a second value that causes the first processor to execute the second series of instructions within the modifier function block.

2. The function block entity of claim 1, wherein the first computer readable memory is the same memory as the second computer readable memory.

3. The function block entity of claim 1, wherein the first processor is located in a process control device having a device memory and wherein the device memory includes the first and second computer readable memories.

4. The function block entity of claim 1, wherein the second computer readable memory is a transportable disc storage memory.

5. The function block entity of claim 1, further including an interface that passes data between the base function block and the modifier function block in a predefined manner.

6. The function block entity of claim 5, wherein the interface includes data values to be used by the modifier function block.

7. The function block entity of claim 5, wherein the interface includes memory address values associated with data to be used by the modifier function block.

8. The function block entity of claim 1, wherein the pointer includes a memory address specifying where in the first computer readable memory the first processor is to find a next instruction.

9. The function block entity of claim 1, wherein the first value includes a null instruction that causes the processor to continue to an immediately following instruction within the base function block.

10. The function block entity of claim 1, wherein the second value includes a memory address associated with the modifier function block.

11. The function block entity of claim 1, wherein each of the multiplicity of communicatively interconnected function blocks executes in a different execution time period and wherein the base function block and the modifier function block both execute in an execution time period associated with the base function block when the pointer is set to the second value.

12. The function block entity of claim 1, wherein the pointer value is resettable after the base function block has been compiled and stored in the first computer readable memory.

13. The function block entity of claim 1, wherein the base function block is a control function block and the modifier function block is an auto-tuning function block that performs auto-tuning of the control function block.

14. A process control system comprising:
a plurality of communicatively interconnected process control devices, a first one of which includes a processor and a memory;
a process control routine having a multiplicity of communicatively interconnected function blocks, wherein each of the multiplicity of communicatively interconnected function blocks includes a software routine that controls an associated processor, and wherein one or more of the multiplicity of communicatively interconnected function blocks provide output signals to one or more other of the multiplicity of communicatively interconnected function blocks, and receive at least one input signal from one or more other of the multiplicity of communicatively interconnected function blocks;
wherein one of the communicatively interconnected function blocks is a base function block that is stored in the memory for controlling operation of the processor, the base function block including,
a first series of processor implementable instructions that cause the processor to perform an operation within the process control routine, and
a resettable branching point located within the series of instructions; and
a modifier function block that is stored in the memory, that is communicatively connected to the base function block and that includes a second series of processor implementable instructions that modify an operation performed by the first series of processor implementable instructions within the base function block.

15. The process control system of claim 14, wherein the resettable branching point includes a pointer settable to a first value that causes the processor to execute another of the first series of processor implementable instructions within the base function block and a second value that causes the processor to execute the second series of instructions within the modifier function block.

16. The process control system of claim 15, further including an interface that passes data between the base function block and the modifier function block in a predefined manner to implement communications between the base function block and the modifier function block.

17. The process control system of claim 16, wherein the interface includes data values to be manipulated by the modifier function block.

18. The process control system of claim 15, wherein each of the multiplicity of communicatively interconnected function blocks executes in a different execution time period and wherein both the base function block and the modifier function block execute in an execution time period associated with the base function block when the pointer is set to the second value.

19. The process control system of claim 14, wherein the pointer is resettable after the base function block has been compiled and stored in the first memory.

20. A modifier function block adapted for use in conditionally modifying the operation of a base function block within a process control routine, where the base function block and the modifier function blocks are part of an entity comprising a multiplicity of interconnected function blocks, and where one or more of the multiplicity of interconnected function blocks provide output signals to one or more other of the multiplicity of interconnected function blocks, and receive at least one input signal from one or more other of the multiplicity of interconnected function blocks, wherein the base function block has a set of instructions for controlling a processor to perform a process control operation within a process control routine and a resettable pointer that, when set to a first value causes the processor to continue implementing the set of instructions within the base function block and that, when set to a second value, causes control of the processor to be given to the modifier function block, the modifier function block comprising:
an interface that defines data associated with the base function block to be used by the modifier function block when the pointer within the base function block is set to the second value and the processor reaches the pointer within the set of instructions within the base function block;
a series of processor implementable instructions stored in a computer readable memory that modify the process control operation performed by the set of instructions within the base function block using the data provided in accordance with the interface; and
a return instruction, stored in the computer readable memory, that returns control of the processor to the set of instructions within the base function block when the series of processor implementable instructions within the modifier function block have been executed by the processor.

21. The modifier function block of claim 20, including a further interface that defines data manipulated by the modifier function block to be used by the base function block when the processor has completed executing the series of processor implementable instructions within the modifier function block.

22. The modifier function block of claim 20, wherein the interface defines memory addresses associated with data to be used by the modifier function lock.

23. The modifier function block of claim 20, wherein the series of instructions within the modifier function block implements an auto-tuning procedure with respect to the base function block.

24. A method of modifying an operation of a base function block adapted to operate within a function block entity comprising a multiplicity of interconnected function blocks, and where one or more of the multiplicity of interconnected function blocks provide output signals to one or more other of the multiplicity of interconnected function blocks, and receive at least one input signal from one or more other of the multiplicity of interconnected function blocks, such base function block having a set of processor implementable instructions therein used to perform part of a process control routine in a process control system, the method comprising the steps of:

storing the base function block in a memory of a process control device having a processor therein;

storing a modifier function block within the memory of the process control device, the modifier function block having a series of processor implementable instructions that modify the operation performed by the set of instructions within the base function block; and placing a resettable pointer in the set of instructions within the base function block, wherein the pointer can be set to a first value that causes another of the set of instructions within the base function block to be executed by the processor when the processor reaches the pointer and a second value that causes the series of instructions within the modifier function block to be executed by the processor when the processor reaches the pointer.

25. The method of modifying the operation of a base function block of claim 24, further including the steps of defining a standard interface that identifies data to be used by the modifier function block and using the standard interface to pass data to the modifier function block when the pointer is set to the second value and the processor reaches the pointer.

26. The method of modifying the operation of a base function block of claim 24, further including the step of changing the pointer from the first value to the second value.

27. The method of modifying the operation of a base function block of claim 24, further including the step of changing the pointer from the first value to the second value when the base function block is operating within a process control routine to thereby alter the process control routine.

28. The method of modifying the operation of a base function block of claim 24, further including the steps of having the series of instructions within the modifier function block define an auto-tuning procedure, changing the pointer within the base function block from the first value to the second value when it is desired to implement the auto-tuning procedure and changing the pointer within the base function block from the second value to the first value when the auto-tuning procedure is finished.

* * * * *

UNITED STATES PATENT AND TRADEMARK OFFICE
CERTIFICATE OF CORRECTION

PATENT NO. : 6,510,351 B1
DATED : January 21, 2003
INVENTOR(S) : Blevins et al.

It is certified that error appears in the above-identified patent and that said Letters Patent is hereby corrected as shown below:

Column 7,
Line 45, please delete "it must be have the" and insert -- it must have --.

Column 10,
Line 50, please delete "Hädgglund-Åström" and insert -- H ägglund-Åström --.

Signed and Sealed this

First Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,510,351 B1  Page 1 of 1
APPLICATION NO. : 09/270291
DATED : January 21, 2003
INVENTOR(S) : Blevins et al.

It is certified that error appears in the above-identified patent and that said Letters Patent is hereby corrected as shown below:

Item (75) on Title page should read as follows:

(75) Inventors: Terrence L. Blevins, Round Rock, TX (US); Dennis L. Stevenson, Round Lake, TX (US); Mark J. Nixon, Round Lake, TX (US); Larry O. Jundt, Round Lake, TX (US)

Signed and Sealed this

Twenty-second Day of May, 2007

JON W. DUDAS
*Director of the United States Patent and Trademark Office*